(12) United States Patent
Hui et al.

(10) Patent No.: US 11,066,570 B2
(45) Date of Patent: Jul. 20, 2021

(54) AQUEOUS STAIN RESISTANT COATING COMPOSITION

(71) Applicant: Valspar Sourcing, Inc., Minneapolis, MN (US)

(72) Inventors: Ronghai Hui, Foshan (CN); Gang Duan, Chicago, IL (US); Rong Xiong, Foshan (CN); Stephen M. Korenkiewicz, Lake Zurich, IL (US); Hui Kou, Foshan (CN)

(*) Notice: Subject to any disclaimer, the term of this patent is extended or adjusted under 35 U.S.C. 154(b) by 670 days.

(21) Appl. No.: 15/794,187

(22) PCT Filed: Apr. 25, 2016

(86) PCT No.: PCT/US2016/029198
§ 371 (c)(1),
(2) Date: Oct. 26, 2017

(87) PCT Pub. No.: WO2016/176145
PCT Pub. Date: Nov. 3, 2016

(65) Prior Publication Data
US 2018/0163074 A1    Jun. 14, 2018

(30) Foreign Application Priority Data
Apr. 27, 2015  (CN) .......................... 201510205940.9

(51) Int. Cl.
| | | |
|---|---|---|
| *C09D 133/08* | (2006.01) |
| *C09D 7/40* | (2018.01) |
| *C08F 220/34* | (2006.01) |
| *C08K 3/22* | (2006.01) |
| *C08K 3/26* | (2006.01) |
| *C08K 3/34* | (2006.01) |
| *C08K 3/36* | (2006.01) |
| *C09D 5/00* | (2006.01) |
| *C09D 5/16* | (2006.01) |
| *C09D 107/00* | (2006.01) |
| *C08K 7/16* | (2006.01) |
| *C08L 33/08* | (2006.01) |

(52) U.S. Cl.
CPC .......... *C09D 133/08* (2013.01); *C08F 220/34* (2013.01); *C08K 3/22* (2013.01); *C08K 3/26* (2013.01); *C08K 3/34* (2013.01); *C08K 3/346* (2013.01); *C08K 3/36* (2013.01); *C09D 5/00* (2013.01); *C09D 5/16* (2013.01); *C09D 7/40* (2018.01); *C09D 107/00* (2013.01); *C08F 220/343* (2020.02); *C08K 7/16* (2013.01); *C08K 2003/2241* (2013.01); *C08K 2003/265* (2013.01); *C08K 2201/003* (2013.01); *C08K 2201/005* (2013.01); *C08L 33/08* (2013.01); *C08L 2201/52* (2013.01)

(58) Field of Classification Search
CPC .......... C09D 133/08; C09D 7/40; C09D 5/00; C09D 5/16; C09D 107/00; C08F 220/34; C08F 220/343; C08K 3/22; C08K 3/26; C08K 3/34; C08K 3/346; C08K 3/36; C08K 7/16; C08K 2003/2241; C08K 2003/265; C08K 2201/003; C08K 2201/005; C08L 33/08; C08L 2201/52
USPC .......................................................... 524/556
See application file for complete search history.

(56) References Cited

U.S. PATENT DOCUMENTS

| | | | | |
|---|---|---|---|---|
| 7,807,752 B2* | 10/2010 | Masutani | ............ | C08G 65/007 525/104 |
| 2003/0171475 A1* | 9/2003 | Miyazaki | ................ | A61Q 1/02 524/449 |
| 2007/0208129 A1 | 9/2007 | Finegan et al. | | |
| 2013/0052454 A1 | 2/2013 | Donovan et al. | | |

FOREIGN PATENT DOCUMENTS

| | | | |
|---|---|---|---|
| CN | 1131960 | A | 9/1996 |
| CN | 1844281 | A | 10/2006 |
| CN | 101263205 | A | 9/2008 |
| CN | 101538438 | A | 9/2009 |
| CN | 101550303 | A | 10/2009 |
| CN | 102212300 | A | 10/2011 |
| CN | 102311690 | A * | 1/2012 |
| CN | 102311690 | A | 1/2012 |
| CN | 102604498 | A | 7/2012 |
| CN | 102952462 | A | 3/2013 |
| CN | 104159986 | A | 11/2014 |
| CN | 104293054 | A | 1/2015 |
| EP | 0971007 | A1 | 1/2000 |
| EP | 2554609 | A2 | 2/2013 |

(Continued)

OTHER PUBLICATIONS

CN102311690 A—machine translation (Year: 2012).*
International Application No. PCT/US2016/029198 filed Apr. 25, 2016, International Preliminary Report on Patentability dated Oct. 31, 2017, 6 pages.

(Continued)

*Primary Examiner* — Ling Siu Choi
*Assistant Examiner* — Ronald Grinsted

(57) ABSTRACT

The present disclosure refers to an aqueous stain resistant coating composition, comprising, one or more aqueous dispersions of self-crosslinkable polymeric particles; and one or more particulate solids, wherein the polymeric particles have a Tg of 10° C. or less; and wherein the particulate solids comprise a combination of sheet-like particulate solids and sphere-like particulate solids in a weight ratio of 1:1 or more; and wherein the coating composition has a pigment volume concentration of 45% or more; and the coating composition is substantially free of volatile organic compounds.

19 Claims, No Drawings

(56) References Cited

FOREIGN PATENT DOCUMENTS

| WO | 9509210 A1 | 4/1995 |
| WO | 0063313 A1 | 10/2000 |
| WO | 03054093 A2 | 7/2003 |
| WO | 2007031480 A1 | 3/2007 |
| WO | 2013134120 A1 | 9/2013 |
| WO | 2013159090 A2 | 10/2013 |
| WO | 2014139074 A1 | 9/2014 |
| WO | 2015013900 A1 | 2/2015 |

OTHER PUBLICATIONS

International Application No. PCT/US2016/029198 filed Apr. 25, 2016, International Search Report and Written Opinion dated Jul. 10, 2016, 9 pages.
Canadian Patent Application No. 2984150, filed Apr. 25, 2016; Office Action dated Sep. 20, 2018, 3 pages.
Chinese Patent Application No. 201510205940.9, filed Apr. 27, 2015; Office Action and Search Report dated Oct. 31, 2017, 9 pages. (Translation included.).
Chinese Patent Application No. 201510205940.9, filed Apr. 27, 2015; Office Action dated Oct. 16, 2018, 10 pages. (Translation included.).
European Application No. 16786967.6, filed Apr. 25, 2016; Extended European Search Report dated Jan. 7, 2019, 7 pages.
European Application No. 16786967.6, filed Apr. 25, 2016; Communication under Article 94(3) EPC dated Dec. 18, 2019, 4 pages.

\* cited by examiner

AQUEOUS STAIN RESISTANT COATING COMPOSITION

CROSS REFERENCE TO RELATED APPLICATION(S)

This application is claims benefit of Chinese Patent Application Serial No. 20151025940.9, filed 27 Apr. 2015 and entitled: "Aqueous Stain Resistant Coating Composition," which is incorporated herein by reference in its entirety.

TECHNICAL FIELD

The present disclosure refers to an aqueous coating composition, more particularly an aqueous stain resistant coating composition having a low VOC content and a high PVC level. In addition, the present disclosure further refers to a stain resistant coating obtainable from said aqueous coating composition.

BACKGROUND

Nowadays, poor stain resistance of coating has become one of the obstacles restricting the development of the coating industry. Environment pollutions are varied. One common pollutant source is suspended particulate solids in air. Other pollutant sources may also include aqueous or oily contaminants, such as black tea, coffee, aqueous pigments, oily pigments and the like, which are prone to fouling on the surface of a coating or into its interior when they are in contact with the coating. Fouling may occur under different situations. For example, the contaminants are prone to fouling on the surface of a coating when the coating contains electrostatic charges on its surface and/or when its film-forming resin is softened due to increased local temperature. Moreover, the contaminants are easily absorbed into its interior through capillary adsorption action, thereby forming temporary contaminants that can be easily removed or permanent contaminants that are difficult to be removed, in the case that the coating is of the capillary microstructure.

There are some approaches for improving stain resistance of the coating in the art. One approach is to reduce its surface tension by simply adding a surface modifier or surface modification components so that the contaminants absorbed by the coating would be reduced. The approach is very simple. However, the added surface modifier will easily migrate toward the coating surface, resulting in a significantly reduced stain resistance after several scrubs. Another approach is to use a resin having a high Tg as a film-forming resin for the coating so that its adhesion to contaminants would be decreased due to softening of the resin at elevated temperature. However, additional coalescing agents are generally required for its film formation. It is known that coalescing agents are usually volatile organic compound (VOC) and thus inevitably lead to a VOC emission. With increasing concerns on health and environmental issues, such inevitable VOC level is undesired. Another approach is to improve compactness of the coating to reduce its absorption to contaminants due to capillary adsorption action. At a given range, a higher pigment volume concentration (PVC) may achieve a more compact coating. However, if PVC is too high, for example higher than 40%, the pores among particulate solids would significantly increase, leading to poor compactness and thus the stain resistance of the coating will significantly deteriorate. Thus, it is a long-term unachievable goal to obtain a coating composition having a high PVC without damaging its stain resistance.

There is still a need for an aqueous stain resistant coating composition that is substantially free of VOC and has a high PVC.

SUMMARY

The present disclosure provides an aqueous stain resistant coating composition, comprising, one or more aqueous dispersions of self-crosslinkable polymeric particles; and one or more particulate solids, wherein the polymeric particles have a Tg of 10° C. or less; and wherein the particulate solids comprise a combination of sheet-like particulate solids and sphere-like particulate solids in a weight ratio of 1:1 or more; and wherein the coating composition has a pigment volume concentration of 45% or more; and the coating composition is substantially free of volatile organic compounds. Preferably, the coating composition has a pigment volume concentration of 50% or more.

In an embodiment of the present disclosure, the coating composition after film formation preferably has a water contact angle of 70 to 110 degree.

The present disclosure also provides a stain resistant coating obtainable from the coating composition of the present disclosure.

It has been surprisingly found by the inventors that a coating composition with a low VOC content and a high PVC can be obtained by using an aqueous dispersion of self-crosslinkable polymeric particles with a low Tg as a film-forming component and a combination of sheet-like particulate solids and sphere-like particulate solids as particulate solids, and the coating from the coating composition can achieve an excellent stain resistance.

As a film-forming resin, polymeric particles having a low Tg such as 10° C. or less have an excellent film-forming property, and would easily form a coating without addition of a coalescing agent that may produce VOC. In addition, use of the polymeric particles allows sufficient dispersion of particulate solids in the coating, even at a high PVC level. Due to sufficient dispersion, sheet-like particulate solids tend to be dispersed in film-forming resin in a scaly arrangement structure, while sphere-like particulate solids effectively fill the pores among sheet-like particulate solids. This allows the disclosed coating composition even at a PVC level of 45% or higher, preferably 50% or more to form a coating with a relatively high compactness. As compared with sphere-like particulate solids, sheet-like particulate solids as arranged in a scaly structure could improve barrier property of the coating and effectively increase the ability of the coating against diffusion of contaminants especially oily contaminants. Moreover, crosslinking of the polymeric particles may further improve compactness and physical and chemical stabilities of the coating. Therefore, according to the present disclosure, an aqueous coating composition having a low VOC content and a high PVC can be obtained and the coating formed from such coating composition has an excellent stain resistance.

It has been also surprisingly found by the inventors that a coating having an excellent resistance to aqueous and oily contaminants both can be obtained by optimizing the ratio of components of the coating composition and thus controlling the water contact angle of the coating within the range of 70 to 110 degree.

The details of one or more embodiments of the invention will be set forth in the description below. The other features, objectives, and advantages of the invention will become apparent.

SELECTED DEFINITIONS

As used herein, "a", "an", "the", "at least one", and "one or more" are used interchangeably, unless indicated otherwise. Thus, for example, a coating composition that comprises "an" additive can be interpreted to mean that the coating composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used in the context of "self-crosslinkable polymeric particles", the term "self-crosslinkable" means the ability of a polymer molecular in the polymeric particles to participate the intramolecular and/or intermolecular crosslinking reaction to form a covalent linkage in absence of any external crosslinking agent.

As used in the context of particulate solids, the term "equivalent diameter" is interpreted as diameter in the case of spherical particles; or as the largest straight line drawn across the particle in the case of non-spherical particles, for instance but not limited to sheets, rods and platelets. Usually, methods for determining the equivalent diameter include optical microscopy, scanning microscopy and atomic force microscopy (AFM). If a microscopical method is used, the dimensions of 100 randomly chosen particles are measured and the average is calculated.

The term "volatile organic compounds (VOCs)" as used herein means any organic compound having a boiling point lower than or equal to 250° C. at a standard pressure of 101.3 kPa.

As used in the context of "aqueous coating composition", the term "substantially free of" volatile organic compounds (VOCs) means that the VOCs content is lower than the detection limit of the standard test GB 18582-2008.

As used in the context of "aqueous coating composition", the term "stain resistant" means that the aqueous coating composition has a dirt pickup resistance comprehensive capability index of 60 or more according to the standard test GB/T 9780-2013.

The term "pigment volume concentration (PVC)" as used herein refers to the ratio of the volume of the particulate solids (i.e. non-binder solids) to the total volume of polymeric particles (binder solids) and particulate solids present in the coating composition. Where the binder and non-binder solids include multiple components, ideal mixing is assumed and all volumes are additive. Briefly, according to the present disclosure, pigment volume concentration (PVC) can be expressed by the following equation:

$$PVC = \frac{V_{[non\text{-}binder\ solid]}}{V_{[non\text{-}binder\ solid]} + V_{[binder\ solid]}}$$

It is well-known that the volume of a substance can be determined as the ratio of its mass to its density. In the present disclosure, the volume of particulate solids may be the sum of volumes of individual particulate solids wherein the volume of each particulate solid is determined as the ratio of mass to density of such particulate solid. The volume of polymeric particles may be determined as the ratio of the mass of non-volatile solids of the aqueous latex to the density of the polymeric particles, under the assumption that the density of polymeric particles is 1 g/cm$^3$.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

The present disclosure provides an aqueous stain resistant coating composition, comprising, one or more aqueous dispersions of self-crosslinkable polymeric particles; and one or more particulate solids, wherein the polymeric particles have a Tg of 10° C. or less; and wherein the particulate solids comprise a combination of sheet-like particulate solids and sphere-like particulate solids in a weight ratio of 1:1 or more; and wherein the coating composition has a pigment volume concentration (PVC) of 45% or more; and the coating composition is substantially free of volatile organic compounds. Preferably, the coating composition has a pigment volume concentration of 50% or more.

As used herein, the term "aqueous latex" or "aqueous dispersion" refers to a stable suspension of polymeric particles in an aqueous liquid medium with the aid of, if necessary, an emulsifier and/or a dispersion stabilizer. Unless expressly indicated otherwise, the terms "aqueous latex" and "aqueous dispersion" as used herein can be interchangeably used. Aqueous dispersions of polymeric particles or aqueous latexes may be produced, for example, through an emulsion polymerization process. Suitable emulsion polymerization processes are well known to a person skilled in the art, and generally include the steps of dispersing and emulsifying polymerizable monomers in water with the aid of, as appropriate, an emulsifier and/or a dispersion stabilizer under agitation; and initiating polymerization of the monomers, e.g., by adding an initiator. In the present disclosure, the polymeric particles can be modified by, for example, incorporating therein some organic functional groups including, but not limited thereto, carboxyl, hydroxyl, amino, isocyanate, sulphonic group or the like, whereby the aqueous latex can be obtained with desirable properties such as dispersability. Therefore, as used herein, the term "aqueous latex" or "aqueous dispersion", unless specified otherwise, is intended to refer to any dispersion of unmodified polymeric particles in an aqueous medium and/ or any dispersion of organo-functional modified polymeric particles in an aqueous medium.

In the aqueous coating composition according to the present disclosure, an aqueous dispersion of polymeric particles having a low Tg is used as a film-forming resin. The polymeric particles may have a glass transition temperature of in or lower, such as a Tg of lower than 5° C. In particular, the polymeric particles may have a glass transition temperature of about −5° C. The glass transition temperature (Tg), as used herein, refers to the critical temperature at which the polymer changes its behavior from being "rubbery" to being "glassy", or vice versa. The glass transition temperature of a polymer may be determined by a standard method known in the art, for example by a Differential Scanning Calorimetry (DSC) method. The polymeric particles having a low Tg would allow sufficient dispersion of particulate solids in the coating of coating composition, even at a high PVC level. Without being bound by any theory, it is believed that the polymeric molecule chain of the polymeric particles having a relatively low Tg have a relatively high movement capacity, thereby allowing relatively sufficient dispersion of polymeric particles.

Moreover, the polymeric particles having a low Tg have an excellent film-forming ability. Thus, the aqueous dispersion of polymeric particles has a suitably Minimum Film Forming Temperature (MFFT). Preferably, the aqueous dispersion has a minimum film forming temperature of down to about −10° C., such as less than 0° C. In an embodiment, the aqueous dispersion has a MFFT of lower than 0±2° C. Therefore the aqueous dispersion of polymeric particles shows an excellent film-formation capability at the most common application temperature (such as about 10-30° C.). As a result, the aqueous coating composition containing above aqueous dispersion is capable of achieving a good film formation without need for addition of any film-formation additives such as coalescent agent, co-solvent or the like which may typically introduce VOC content. Therefore, the aqueous coating composition according to the present disclosure is substantially free of VOC.

In the aqueous dispersion according to the present disclosure, polymeric particles may also be self-crosslinkable, which polymer moleculars are capable of participating the intramolecular and/or intermolecular crosslinking reaction to form a covalent linkage in absence of any external crosslinking agent during and/or after film formation. Preferably, the polymeric particles are self-crosslinkable at room temperature, such as a temperature of from 20 to 30° C. The crosslinking as described above further improves the compactness and physical and chemical stabilities of the coating. The resulting cross-linked network structure restricts migration and agglomeration of particulate solids in the coating and reduces or even eliminates the resulting fine porous structure therefrom, so that the coating has a more durable stain resistance.

According to the present disclosure, polymeric particles may be any kinds of acrylics polymeric particles, including acrylates polymeric particles, styrene-acrylates polymeric particles, organic silicones modified acrylates polymeric particles, polyurethanes modified acrylates polymeric particles, or the combination thereof. In a preferred embodiment of the present disclosure, the acrylics polymeric particles comprise acrylates polymeric particles.

In the present disclosure, the aqueous dispersion of self-crosslinkable polymeric particles with a low Tg can be prepared by a suitable emulsion polymerization process which is well known to a person skilled in the art and comprises for example the following steps: dispersing and emulsifying polymerizable monomers in water with the aid of, as appropriate, an emulsifier and/or a dispersion stabilizer under agitation; and initiating polymerization of the monomers, e.g., by adding an initiator. Alternatively, as an example, any suitable commercially available product, such as aqueous latex SF-506 from DOW, may be used.

The size of the polymeric particles of the aqueous dispersion or latex may be measured in terms of the z-average particle size which is well known in the art. The z-average particle size can be determined according to a dynamic light scattering method by using, for example, a Malvern Zetasizer 3000HS microscopic particle size analyzer from Malvern Instrument. In the present disclosure, the polymeric particles of the aqueous dispersion have a z-average particle size of at most 200 nm, preferably less than 180 nm, more preferably less than 150 nm. However, the z-average particle size of the polymeric particles is preferably at least 50 nm, more preferably 80 nm or more, and even more preferably 100 nm or more. In a preferred embodiment, the particle size of the polymeric particles of the aqueous dispersion or latex is in the range of 100 to 200 nm.

Preferably, the aqueous coating composition according to the present disclosure comprises from about 25 wt % to about 70 wt % of the aqueous dispersion as described above, based on the total weight of the aqueous coating composition. More preferably, the amount of the aqueous dispersion may be from about 27 wt % or about 30 wt % to about 70 wt %, about 65 wt %, about 60 wt %, based on the total weight of the aqueous coating composition. In addition, additional water is added in formulating the aqueous coating composition, then the amount of additional water together with the water previously present in the aqueous dispersion of acrylics polymeric particles may be taken into account when determining the total weight of the aqueous dispersion.

The aqueous coating composition according to the present disclosure may further include one or more particulate solids. As used herein, the term "particulate solids" refers to any solid material which is substantially insoluble in a dispersion medium at the temperature concerned, and which it is desirably dispersed in a finely divided form in the dispersion medium. The particulate solids may be in shape of sphere, fiber, flake, or other regular or irregular shapes of micrometric or even nanometric size.

In the aqueous coating composition according to the present disclosure, the particulate solids comprise a combination of sheet-like particulate solids and sphere-like particulate solids.

Sheet-like particulate solids are herein understood to be particles having a flat shape with a large difference in the three dimensions such that the smallest dimension (the thickness) is much smaller than the size of the particles in the other two dimension (the length and the width). The sheet-like particulate solids may consist of one or more individual particulate solids closely packed together. The thickness (smallest dimension) of the sheet-like particulate solids is less than 500 nm, preferably less than 200 nm, more preferably less than 100 nm, even more preferably less than 80 nm, and most preferably less than 50 nm. For the sake of clarity it is noted that the sheet-like particulate solids do not need to have a flat structure. Due to the very low thickness, the sheet-like particulate solids might be bended, curved or waved or deformed otherwise as well. The thickness of the sheet-like particulate solids can be determined by standard methods, such as by electron microscopy. The above ranges of thickness may be preferable, but is not limited to therein. The sheet-like particulate solids may have an even higher thickness, such as 600 nm or higher, or 800 or higher, as long as the particulate solids are of a flat shape.

The sheet-like particulate solids in the aqueous coating composition according to the present disclosure preferably have an equivalent diameter of 2 microns or higher, 5 microns or higher, or 10 microns or higher. The upper limit of the equivalent diameter can be selected as needed, generally 30 microns or smaller, 20 microns or smaller, or 15 microns or smaller. The equivalent diameter of the sheet-like particulate solids can be determined by measuring the equivalent diameter of 100 randomly chosen particulate solids via scanning electron microscope (SEM) and calculating the average.

The suitable sheet-like particulate solids in aqueous coating composition according to the present disclosure comprise sheet-like talcum powder under the trade name TA-800 available from Guangfu Building Material Co., Ltd., China, sheet-like mica powder under the trade name Sericite mica powder available from Taidi Chemical Co., Ltd. Foshan city, China, and the like, or any combination thereof.

Sphere-like particulate solids are herein understood to be spherical or spheroidal particles with a little difference in the three dimensions. Similarly, the sphere-like particulate solids may consist of one or more individual particulate solids closely packed together. According the present disclosure, the size of the sphere-like particulate solids is much smaller than that of the sheet-like particulate solids. For example, the equivalent diameter of the sphere-like particulate solids may be one fourth of the equivalent diameter of the sheet-like particulate solids, preferably one sixth of the equivalent diameter of the sheet-like particulate solids, more preferably one eighth of the equivalent diameter of the sheet-like particulate solids, even more preferably one tenth of the equivalent diameter of the sheet-like particulate solids.

The sphere-like particulate solids in the aqueous coating composition according to the present disclosure preferably have an equivalent diameter of 0.2 microns or higher, 0.5 microns or higher, or 1.0 microns or higher. The upper limit of the equivalent diameter can be selected as needed, generally 6 microns or smaller, 4 microns or smaller, or 2 microns or smaller. The equivalent diameter of the sphere-like particulate solids can be determined by measuring the equivalent diameter of 100 randomly chosen particulate solids via scanning electron microscope (SEM) and calculating the average.

The suitable sphere-like particulate solids in the aqueous coating composition according to the present disclosure comprise solid spherical calcium carbonate under the trade name GF-168 available from Guangfu Building Material Co., Ltd., China, glass spheres under the trade name Zeesphere TM W-410, W-610 available from 3M Company, USA, or the like.

It has been surprisingly founded by the inventors that the combination of sheet-like particulate solids and sphere-like particulate solids may produce a more compact coating. Without being bound by any theory, it is believed that in the case of sufficient dispersion, the sheet-like particulate solids are arranged in a scaly structure, while the sphere-like particulate solids effectively fill the pores among sheet-like particulate solids. This allows particulate solids to be arranged more closely, thereby producing a highly compact coating even at a high PVC level. For example, the resulting coating is compact at a PVC level of 45% or higher, preferably 50% or more. In addition, it has been surprisingly found that as compared with the sphere-like particulate solids, the sheet-like particulate solids arranged in a scaly structure could further improve barrier property of the coating and effectively increase the ability of the coating against permeation of contaminants especially oily contaminants, thereby preventing permanent pollution due to diffusion.

In the present disclosure, the weight ratio of sheet-like particulate solids and sphere-like particulate solids is 1:1 or higher. Preferably, the amount of sheet-like particulate solids is higher, more preferably much higher than the amount of sphere-like particulate solids. For example, the weight ratio of sheet-like particulate solids and sphere-like particulate solids is 1.0:1 or higher but 3.0:1 or lower. A more compact coating can be obtained with above weight ratio.

The particulate solids in the aqueous coating composition according to the present disclosure may further comprise other non-porous particulate solids. The term "non-porous particulate solids" as used herein refers to any volume extender suitable for coating as long as it has no porous structure. According the present disclosure, non-porous particulate solids can be in organic or inorganic particulate form. There is no special limit on the shape of particulate solids, and the solids may be of any suitable shape. The equivalent diameter of non-porous particulate solids may vary in a wide range, such as in the range of from about 10 nm to 50 microns.

According to the present disclosure, examples of particulate solids comprise pigments, fillers or the combination thereof, especially those pigments, fillers or the combination thereof suitably used coating, paint and stain.

In some embodiments, the particulate solids are selected from inorganic pigments comprising for example metal oxides such as titanium dioxide, iron oxides, zinc oxide, zirconia, or aluminia; metal composite oxides containing two or more metal elements including manganese, nickel, titanium, chromium, antimony, magnesium, cobalt, iron, or aluminum; oxymetallic compounds, such as bismuth vanadate, cobalt aluminate, cobalt zincate, or zinc chromate; metallic pigments, such as aluminum flake, copper, and copper-zinc alloys; and pearlescent pigments, such as lead carbonate and bismuth oxychloride.

In some embodiments, the particulate solids are selected from the group of inorganic fillers comprising calcium carbonate, calcium sulfate, calcium oxide, calcium oxalate, calcium phosphate, calcium phosphonate, barium sulfate, barium carbonate, magnesium oxide, magnesium hydroxide, aluminum trihydrate, silica (including natural amorphous silica, natural crystalline silica, natural diatomaceous earth, precipitated silica, fumed silica and nano-silica), silicates (including talc, kaolin, wollastonite, mica, sericite, synthetic aluminum silicate), metal fibers, glass fibers, carbon black, and the like.

In a particular embodiment of the disclosure, the particulate solids comprise titanium dioxide, calcium carbonate, talcum powder, mica or any combination thereof. In a more particular embodiment, the particulate solids comprise rutile titanium dioxide, solid sphere-like calcium carbonate, sheet-like talc, sheet-like mica or any combination thereof.

In an embodiment of the disclosure, the aqueous stain resistant coating composition comprises from 32 to 65 wt % of the particulate solids, based on the total weight of the coating composition. Preferably, the amount of the particulate solids may be from about 35 wt %, about 40 wt %, about 42 wt %, about 45 wt % to about 63 wt % or about 60 wt %.

Optionally, the aqueous coating composition according to the present disclosure may include surface modification components for decreasing the surface tension of the coating therefrom.

Examples of the surface modification components comprise fluoro agents, organic silicone resin emulsion or other components. According to the present disclosure, all type of surface modification components are commercially available products. As an example of fluoro agent, FS81 commercially available from DuPont Company, USA can be used. As an example of organic silicone resin emulsion, B545 and BS-1001 commercially available from Wacker, Germany and the like can be used.

The amount of surface modification components can be determined by a skilled in the art through conventional experiments as needed. In an embodiment of the present disclosure, the aqueous coating composition comprises 0.5 to 2.0 wt % of the fluoro agents, based on the total weight of the coating composition. In an embodiment of the present disclosure, the aqueous coating composition comprises 0.5 to 2.0 wt % of the organic silicone resin emulsion, based on the total weight of the coating composition.

According to the present disclosure, the aqueous coating composition may further comprise additional additives that are commonly-used in coating composition. Suitable additives include a thickener, a dispersing agent, a wetting agent, a defoamer, a pH adjuster, a bactericide, a fungicide, a coalescing agent having a boiling point of greater than 250° C. or any combination thereof.

Suitable thickeners include cellulose ether thickener, alkali swelling thickener, polyurethane thickener, hydrophobically modified polyurethane thickener or any combination thereof. All of these types of thickeners are commercially available products. For example, as an example of cellulose ether thickener, hydrophobically modified hydroxyethyl cellulose ether thickener PLUS 330 commercially available from ASHLAND Company, USA, can be used. As an example of alkali swelling thickener, TT935 commercially available from Dow Chemical Co., USA can be used. As an example of polyurethane thickener, RM-8W commercially available from Rohm & Haas Company, USA can be used.

In a preferred embodiment, the aqueous coating composition comprises about 0.1 wt % to about 10 wt %, preferably about 0.2 wt % to about 5.0 wt %, more preferably 0.3 wt % to about 2.0 wt %, even more preferably 0.3 wt % to about 1.0 wt % of the thickeners, based on the total weight of the coating composition.

Suitable dispersing agent may include an anionic dispersing agent, a cationic dispersing agent, a nonionic dispersing agent, amphiprotic dispersing agent or any combination thereof. All of these types of dispersing agents are commercially available products. In a preferred embodiment, suitable dispersing agents includes polyacrylate dispersing agents, polymethacrylate dispersing agents, polycarboxylate dispersing agents, or any combination thereof. As an example of polyacrylate dispersing agents, polyacrylate dispersing agent P30 commercially available from Arkema Company, France, can be used.

In a preferred embodiment, the aqueous coating composition comprises about 0.1 wt % to about 5.0 wt %, preferably about 0.1 wt % to about 2.0 wt %, more preferably 0.2 wt % to about 0.6 wt % of the dispersing agents, based on the total weight of the coating composition.

Suitable defoamer may include organic siloxane defoamers, oil defoamers, polyether defoamers, polyether-modified organic silicone defoamers, or any combination thereof. All of these types of defoamers are commercially available products. As an example of organic siloxane defoamers, SN154 commercially available from S-NOPCO Company, Japan, can be used. As an example of oil defoamers, CF246 commercially available from Blackburn Chemicals Ltd., France, can be used.

In a preferred embodiment, the aqueous coating composition comprises about 0.1 wt % to about 5.0 wt %, preferably about 0.1 wt % to about 2.0 wt %, more preferably 0.2 wt % to about 0.6 wt % of the defoamers, based on the total weight of the coating composition.

Suitable wetting agent may include ionic wetting agents, nonionic wetting agents, polyfunctional wetting agents, or any combination thereof. All of these types of wetting agents are commercially available products. As an example of ionic wetting agents, Dispers 715 W commercially available from Tego Company, Germany, can be used. As an example of nonionic wetting agents, Triton X-100 commercially available from Dow Chemical Co., USA, can be used. As an example of polyfunctional wetting agents, Dispers 760W commercially available from Tego Company, Germany, can be used.

In a preferred embodiment, the aqueous coating composition comprises about 0.1 wt % to about 1 wt %, preferably about 0.1 wt % to about 0.8 wt %, more preferably 0.1 wt % to 0.5 wt %, still more preferably 0.1 wt % to 0.3 wt % of the wetting agents, based on the total weight of the coating composition.

Suitable pH adjuster may include anhydrous sodium carbonate, sodium hydroxide, potassium hydroxide, sodium bicarbonate, alcohols amine, ammonia, triethylamine, or any combination thereof. In a preferred embodiment, pH adjuster includes anhydrous sodium carbonate, sodium hydroxide, or sodium bicarbonate.

In a preferred embodiment, the aqueous coating composition comprises about 0.1 wt % to about 10 wt %, preferably about 0.1 wt % to about 0.3 wt % of the pH adjusters, based on the total weight of the coating composition.

Suitable high boiling point coalescing agents include coalescing agents having a boiling point of greater than 250° C. All of these types of coalescing agents are commercially available products. For example, as an example of high boiling point coalescing agents, Colsoal 290 commercially available from Chemoxy Company, UK can be used.

In a preferred embodiment, the aqueous coating composition comprises about 0 wt % to about 2.0 wt %, preferably about 0.1 wt % to about 0.5 wt %, more preferably about 0.1 wt % to about 0.3 wt % of the coalescing agents having a boiling point of greater than 250° C., based on the total weight of the coating composition.

Suitable bactericides include quaternary ammonium salt bactericides, chlorine bactericides, peroxide bactericides, oxazoline bactericides, aldehyde bactericides or any combination thereof. All types of bactericides are commercially available products. For example, as an example of bactericides, CM1P5 commercially available from Dow Chemical Co., USA can be used.

In a preferred embodiment, the aqueous coating composition comprises about 0.1 wt % to about 10 wt %, preferably about 0.1 wt % to about 0.3 wt % of the bactericides, based on the total weight of the coating composition.

Suitable fungicides include phenolic fungicides, chlorophenolic fungicide, esters fungicides, heterocyclic fungicides, amides fungicide, organic metal salts fungicides, inorganic salts fungicides, or any combination thereof. All types of fungicides are commercially available products. For example, as an example of fungicides, W350 commercially available from Dow Chemical Co., USA can be used.

In a preferred embodiment, the aqueous coating composition comprises about 0.1 wt % to about 10 wt %, preferably about 0.1 wt % to about 0.5 wt %, more preferably 0.1 wt % to 0.3 wt % of the fungicides, based on the total weight of the coating composition.

In an embodiment, the aqueous coating composition comprises, based on the total weight of the coating composition,
25 to 65 wt % of the aqueous dispersion;
32 to 65 wt % of the particulate solids;
0.1 to 2 wt % of the fluoro agents;
0.1 to 2 wt % of the organic silicone resin emulsion; and
0 to 10 wt % of the additional additives comprising a thickener, a dispersing agent, a defoamer, a wetting agent, a pH adjuster, a coalescing agent with a boiling point of greater than 250° C., a bactericide, or a fungicide, or any combination thereof.

In a preferred embodiment, the aqueous coating composition comprises, based on the total weight of the coating composition,
30 to 65 wt % of the aqueous dispersion of acrylics polymer particles;
15 to 25 wt % of rutile titanium dioxide;
10 to 15 wt % of sheet-like talc;
2 to 12 wt % of sheet-like mica;
5 to 12 wt % of solid sphere-like calcium carbonate;
0.4 to 1 wt % of the thickener;
0.2 to 0.6 wt % of the dispersing agent;
0.2 to 0.6 wt % of the defoamer;
0.1 to 0.3 wt % of the wetting agent;
0.1 to 0.3 wt % of the pH adjuster;
0.1 to 0.3 wt % of the fluoro agent;
0.1 to 1.0 wt % of the organic silicone resin emulsion;
0 to 2.0 wt % of the coalescing agent;
0.1 to 0.3 wt % of the bactericide; and
0.1 to 0.3 wt % of the fungicide.

The preparation of the aqueous coating composition according to the disclosure can be effected by any suitable mixing process as well-known by a skilled person in the art. For example, the aqueous coating composition may be prepared by adding the aqueous dispersion, fillers, if present additional additives to a vessel, followed by homogenizing the resulting mixture via agitation. Alternatively, the aqueous coating composition may be prepared by mixing fillers with a part of the additional additives in a vessel, followed by adding the aqueous dispersion and the remaining additional additives and agitating the resulting mixture to be homogeneous. If required, additional water can be added during the preparation of the aqueous coating composition. The amount of additional water should be summed into the total weight of the aqueous dispersion.

The aqueous coating composition according to the present disclosure is substantially free of VOC and the VOC content is lower than the detection limit, as measured by gas chromatography (GC) according to the standard test method GB 18582-2008.

The aqueous coating composition according to the present disclosure also meets the requirements of class A in French "Décret n° 2011-321" emission standard of latex paints.

The aqueous coating composition of the present disclosure can be applied by conventional processes as known by a skilled person in the art. For example, the aqueous coating composition may be applied by means of a spraying gun, a roll, or a brush. In this way, a coating can be formed from the aqueous coating composition according to the present disclosure, which also falls under the scope of the present disclosure. Therefore, in a further aspect of the present disclosure, it is provided a coating obtainable by the aqueous coating composition as described above.

The aqueous coating composition according to the present disclosure results in a coating having an excellent stain resistance.

As well-known in the art, common used stain resistant coatings usually are directed to specific types of contaminants, which have an excellent stain resistance against either aqueous contaminants or oily contaminants. It has been surprising found by the inventors that a coating having a water contact angle within the range of 70 to 110 degree can be formed by using the aqueous coating composition of the present disclosure, especially having the disclosed components and their amounts, which coating has an excellent stain resistance against aqueous and oily contaminants both.

In an embodiment of the present disclosure, the coating formed from the aqueous coating composition of the present disclosure shows excellent resistance to aqueous and oily contaminants both according to the standard test method GB/T 9780-2013.

The coating prepared from the aqueous coating composition of the present disclosure also has an excellent scrub resistance. Preferably, the coating formed from the aqueous coating composition of the present disclosure is capable of resisting against more than 10000 times of scrub, more preferably more than 11000 times of scrub, even more preferably more than 15000 times of scrub, most preferably 18000 times of scrub in the standard test method GB/T9756-2009.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment.

Test Methods

VOC Content is measured by the standard gas chromatography method according to GB 18582-2008.

Scrub Resistance is evaluated in the standard test method of GB/T 9756-2009.

Stain Resistance is measured by a dirt pickup resistance comprehensive capability index according to the standard test GB/T 9780-2013. The dirt pickup resistance comprehensive capability index may be determined by the following steps.

First, the dirt pickup resistance is determined by the formula I below, wherein the tested contaminants include vinegar, black tea, blue-black ink, a water-soluble melanin, an alcohol-soluble melanin and a mixture of Vaseline and carbon black, $$X = \frac{Y_1}{Y_0} \times 100\% \qquad \text{Formula I}$$

in which

X represents the dirt pickup resistance of the coating against contaminants, with two significant digits;

$Y_1$ represents the average reflectance of the coating after being contaminated;

$Y_0$ represents the initial average reflectance of the coating as such.

Second, the dirt pickup resistance is rated into 1 to 10 scores by the rating standard in Table 3 of GB/T 9780-2013 on the basis of the above measured results with "1" representing the worst resistance against the corresponding contaminants and "10" representing the best resistance against the corresponding contaminates.

Third, the dirt pickup resistance comprehensive capability index is determined by averaging the stain resistance scores against various contaminants, using the formula II below:

$$R' = \frac{\sum_{i=1}^{n=6} R_i}{n} \times 10 \qquad \text{Formula II}$$

in which

R' stands for the dirt pickup resistance comprehensive capability index of the coating, with two significant digits;

$R_i$ stands for the score of the coating against each contaminant;

n stands for the number of the contaminants to be tested.

Contrast Ratio is determined according to the standard test method of GB/T9756-2009, which refers to the ratio of the average reflectance of the coating on a black sheet to the average reflectance of the coating on a white sheet.

Water Contact Angle is determined by a sessile drop method using deionized water as a test liquid on the Easy Drop, Drop Shape Analysis 20 equipment from KRUSS Company followed by averaging three different measurement points on the surface of each sample.

Materials:

The materials used in Examples are listed in Table 1 below.

TABLE 1

| Trade Name | Supplier | Description |
| --- | --- | --- |
| SF 506 | Dow Chemical Co., USA | Acrylics polymer dispersion |
| R706 | DuPont Company, USA | Rutile titanium dioxide |
| GF-168 | Guangfu Building Material Co., Ltd. China | Solid spherical calcium carbonate |
| TA-800 | Guangfu Building Material Co., Ltd. China | Sheet-like talcum powder |
| Sericite mica | Taidi Chemical Co., Ltd. Foshan city, China | Sheet-like mica powder |
| PLUS 330 | ASHLAND Company, USA | Cellulose ethers thickener |
| TT-935 | Dow Chemical Co., USA | Alkali swelling thickener |
| Tritron X-100 | Dow Chemical Co., USA | Non-ionic wetting agent |
| P30 | Arkema Company, France | Polyacrylate dispersing agent |
| SN 154 | S-NOPCO Company, Japan | Organic siloxane defoamer |
| CF 246 | Blackburn Chemicals Ltd. France | Mineral oil defoamer |
| CM1P5 | Dow Chemical Co., USA | Bactericides |
| W 350 | Dow Chemical Co., USA | Fungicides |
| FS 81 | DuPont Company, USA | Fluoro agent |
| BS 45 | Wacker, Germany | Organic silicone resin emulsion |
| Colsoal 290 | Chemoxy Company, UK | high boiling point coalescing agent |
| anhydrous sodium carbonate | general industrial product | pH adjuster |

Examples 1-2

The aqueous coating compositions of Examples 1-2 were prepared as follows.

180 g or 200 g of deionized water and certain amounts of thickener Plus 330, wetting agent Tritox X-100, dispersing agent P30, defoamer SN154, and anhydrous sodium carbonate were added in a vessel, and mixed under agitation at 350-450 rpm for 5-10 min to be homogeneous. Then rutile titanium dioxide 8706, heavy calcium carbonate GF-168, talc TA-800, Sericite mica were added under agitation at 80-1250 rpm for 20-30 minutes, thereby forming a homogeneous slurry. Finally, mineral oil defoamer CF 246, fluoro agent FS 81, organic silicone resin emulsion B545, optional high boiling point coalescing agent Colsoal 290, acrylics polymer dispersion SF 506, bactericides CM1P5, fungicides W 350, alkali swelling thickener TT-935 and the remaining deionized water were added under agitation at 500-700 rpm to be homogeneous, thereby forming the aqueous coating compositions of Example 1 or 2. The amounts of ingredients in the aqueous coating compositions of Examples 1-2 were listed in Table 2.

TABLE 2

Compositions and test results of the aqueous coating composition

|  |  | Ex. 1 | Ex. 2 |
|---|---|---|---|
| Compositions |  |  |  |
|  | SF 506 | 320 | 270 |
| Particulate solids | TA-800 | 130 | 140 |
|  | Sericite mica | 30 | 50 |
|  | GF-168 | 50 | 60 |
|  | R706 | 220 | 180 |
| Dispersing agent P30 |  | 4 | 4 |
| Wetting agent Tritron X-100 |  | 2 | 2 |
| Thickener | Plus 330 | 3 | 3 |
|  | TT935 | 4 | 4 |
| Defoamer | SN154 | 2 | 2 |
|  | CF 246 | 2 | 2 |
| Anhydrous sodium carbonate |  | 2 | 2 |
| Fluoro agent FS 81 |  | 2 | 2 |
| Organic silicone emulsion BS 45 |  | 5 | 5 |
| High boiling point coalescing agent Colsoal 290 |  | 0 | 11 |
| CM1P5 |  | 2 | 2 |
| W350 |  | 2 | 2 |
| Deionized water |  | 220 | 259 |
| Test Results |  |  |  |
| VOC Content |  | N·d$^a$ | N·d$^a$ |
| Scrub Resistance |  | >10000 | >10000 |
| Stain Resistance |  | >60 | >60 |
| Emission |  | A+ class | A class |
| Water Contact Angle |  | 89.3° | 91.3° |
| Contrast Ratio |  | 0.96 | 0.95 |
| PVC Content |  | 45% | 50% |

$^a$N.d denotes that the VOC content was lower than the detection limit.

In the above Table, the density of talc TA-800 is 2.9 g/cm$^3$; the density of sericite mica is 2.7 g/cm$^3$; the density of heavy calcium carbonate GF-168 is 2.7 g/cm$^3$; the density of rutile titanium dioxide is 4.2 g/cm$^3$; the aqueous dispersion has a solid content of 47.5% assuming that its density is 1 g/cm$^3$.

As can be clearly seen from Table 2, the aqueous coating compositions of Examples 1-2 were substantially free of VOC and had a high PVC content, the coating from the composition exhibited an excellent stain resistance.

Example 3

In order to clearly demonstrate the stain resistance against aqueous stains and oily contaminants of the coating formed from the aqueous coating compositions according to the present disclosure, Table 3 below summarized the stain resistance against various stains of the coating formed from the aqueous coating compositions of Example 1.

The aqueous stain resistant coating compositions of Example 1

|  | vinegar | black tea | water-soluble melanin | blue-black ink | alcohol-soluble melanin | mixture of Vaseline and carbon black |
|---|---|---|---|---|---|---|
| $Y_0$ | 94.37 | 94.35 | 94.31 | 94.25 | 94.34 | 94.24 |
| $Y_1$ | 93.94 | 92.33 | 93.77 | 85.04 | 52.48 | 91.73 |
| X | 99.54 | 97.86 | 99.43 | 90.23 | 55.63 | 97.34 |
| $R_i$ | 10 | 9 | 10 | 8 | 5 | 8 |
| $R^s$ |  |  | 83 |  |  |  |

As shown in Table 3, the aqueous coating composition according to the present disclosure after film-forming exhibited a good resistance against both aqueous and oily stains.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. An aqueous stain resistant coating composition, comprising, one or more aqueous dispersions of self-crosslinkable polymeric particles; and one or more particulate solids,
    wherein the polymeric particles have a Tg of 10° C. or less; and
    wherein the particulate solids comprise a combination of sheet-like particulate solids and sphere-like particulate solids in a weight ratio of 1:1 or more, wherein the size of the sphere-like particulate solids is smaller than that of the sheet-like particulate solids; and
    wherein the coating composition has a pigment volume concentration of 45% or more; and the coating composition is substantially free of volatile organic compounds.

2. The aqueous stain resistant coating composition according to claim 1, comprising, based on the total weight of the coating composition, 25 to 70 wt % of the aqueous dispersion of polymeric particles; and 32 to 75 wt % of the particulate solids.

3. The aqueous stain resistant coating composition according to claim 1, wherein the coating composition has a pigment volume concentration of 50% or more.

4. The aqueous stain resistant coating composition according to claim 1, wherein the polymeric particles have a Tg of 5° C. or less.

5. The aqueous stain resistant coating composition according to claim 1, wherein the polymeric particles have a Tg as low as −5° C.

6. The aqueous stain resistant coating composition according to claim 1, wherein the polymer particles have a particle size of 200 nm or less.

7. The aqueous stain resistant coating composition according to claim 1, wherein the polymer particles comprises acrylates polymers, styrene-acrylates polymers, organic silicones modified acrylates polymers, polyurethanes modified acrylates polymers or any combination thereof.

8. The aqueous stain resistant coating composition according to claim 1, wherein the polymeric particles are self-crosslinkable at room temperature.

9. The aqueous stain resistant coating composition according to claim 1, wherein the particulate solids comprise the combination of sheet-like particulate solids and sphere-like particulate solids in a weight ratio of 1.0:1 or more but 3.0:1 or less.

10. The aqueous stain resistant coating composition according to claim 1, wherein the sheet-like particulate solids have an equivalent diameter of 2 μm or more.

11. The aqueous stain resistant coating composition according to claim 1, wherein the particulate solids further comprise other non-porous particulate solids.

12. The aqueous stain resistant coating composition according to claim 1, wherein the particulate solids comprise pigments or fillers.

13. The aqueous stain resistant coating composition according to claim 12, wherein the particulate solids comprise metals, alloys, metal oxides, metal salts, silicon dioxide, silicates or any combination thereof.

14. The aqueous stain resistant coating composition according to claim 12, wherein the particulate solids comprise calcium carbonate, talc, mica or any combination thereof.

15. The aqueous stain resistant coating composition according to claim 14, wherein the particulate solids comprise solid, sphere-like calcium carbonate, sheet-like talc, sheet-like mica or any combination thereof.

16. The aqueous stain resistant coating composition according to claim 1, further comprising a fluoro agent, an organic silicone resin emulsion or the combination thereof.

17. The aqueous stain resistant coating composition according claim 16, comprising, based on the total weight of the coating composition,
   25 to 65 wt % of the aqueous dispersion;
   32 to 65 wt % of the particulate solids;
   0.1 to 2 wt % of the fluoro agents;
   0.1 to 2 wt % of the organic silicone resin emulsion; and
   0 to 10 wt % additional additives comprising a thickener, a dispersing agent, defoamer, a wetting agent, a pH adjuster, a coalescing agent with a boiling point of greater than 250° C., a bactericide, or a fungicide, or any combination thereof.

18. The aqueous stain resistant coating composition according to claim 1, wherein the coating composition after film formation has a water contact angle of 70 to 110 degree.

19. A stain resistant coating obtained from allowing the aqueous stain resistant coating composition of claim 1 to cure over a substrate.

* * * * *